United States Patent [19]

Burchell, Jr. et al.

[11] Patent Number: 4,701,476
[45] Date of Patent: Oct. 20, 1987

[54] POLYURETHANE ELASTOMERS PREPARED FROM HIGH MOLECULAR WEIGHT PREPOLYMERS

[75] Inventors: Donald J. Burchell, Jr., Clute; Richard D. Peffley, Lake Jackson, both of Tex.

[73] Assignee: The Dow Chemical Company, Midland, Mich.

[21] Appl. No.: 813,893

[22] Filed: Dec. 27, 1985

[51] Int. Cl.$^4$ ............................................... C08G 18/14
[52] U.S. Cl. .................................... 521/159; 252/182; 524/196; 528/60; 528/61; 528/64; 528/65; 528/66
[58] Field of Search ................. 521/159; 528/60, 61, 528/64, 65, 66; 252/182; 524/196

[56] References Cited

U.S. PATENT DOCUMENTS 4,327,204   4/1882   Oysizu et al. .................... 528/63

Primary Examiner—Maurice J. Welsh

[57] ABSTRACT

This invention is an improvement in a process for preparing polyurethane and/or polyurea polymers wherein an isocyanate terminated quasi-prepolymer is reacted with an active hydrogen-containing composition to form a polyurethane and/or polyurea polymer, the improvement comprising employing as the quasi-prepolymer a solution of an isocyanate terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

In another aspect, this invention is a quasi-prepolymer which comprises a solution of an isocyanate-terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

18 Claims, No Drawings

POLYURETHANE ELASTOMERS PREPARED FROM HIGH MOLECULAR WEIGHT PREPOLYMERS

BACKGROUND OF THE INVENTION

This invention relates to the preparation of polyurethane and/or polyurea elastomers, particularly to polyurethane and/or polyurea elastomers which are prepared from a high molecular weight prepolymer.

Polyurethane elastomers are being used in a growing variety of applications. Since the development of reaction injection molding (RIM) techniques permitted the rapid production of molded parts, polyurethane have been developed for many end uses. For example, low to moderate modulus polyurethanes have found use as static elastomers, such as automobile bumper covers, front and rear fascia for automobiles, beer keg skirts and the like. High modulus polyurethanes are being explored for use in making automobile doors, fenders, quarter panels and similar exterior parts.

In preparing polyurethane and/or polyurea elastomers, the common practice is to react a polyisocyanate, or a quasi-prepolymer thereof, with a relatively high equivalent weight active hydrogen containing material, usually a polyether polyol or aminated derivative thereof, and a low equivalent weight polyamine or polyol (chain extender). The polyol provides "soft segments" to the elastomer, i.e. provides the elastomer with elasticity, low temperature properties and impact strength. The chain extender reacts with the polyisocyanate to provide "hard segments", i.e. contributes stiffness, high temperature properties, and tensile strength.

It is generally desirable in most circumstances to form a polymer in which the soft and hard segments are well phase-segregated. In most cases, good phase segregation leads to improved properties, especially good thermal properties. Thus, it is desirable to provide a process whereby phase segregation is improved. Improved phase segregation may enable the practitioner to employ lesser amounts of chain extender in making a polymer of a given flexural modulus. Since the chain extender is often a relatively expensive component of the polymer, this represents a significant economic advantage.

In addition, it is often desirable to improve the "toughness" of polyurethane and/or polyurea polymers, that is, improve the tear properties and/or the impact strength thereof.

SUMMARY OF THE INVENTION

This invention is such an improved process. This invention is an improvement in a process for preparing polyurethane and/or polyurea polymers wherein an isocyanate terminated quasi-prepolymer is reacted with an active hydrogen-containing composition to form a polyurethane and/or polyurea polymer, the improvement comprising employing as the quasi-prepolymer a solution of an isocyanate terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

In another aspect, this invention is a quasi-prepolymer which comprises a solution of an isocyanate-terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

In the practice of the process of this invention, polyurethane and/or polyurea polymers, particularly elastomeric, non-cellular or microcellular polymers, can be prepared which exhibit improved toughness, as evidenced by tear or Impact properties, and better thermal stability, as compared to other polymers of similar hardness and flexural modulus. In addition, the practice of this invention provides a method whereby increased flexural modulus, at a given level of chain extender, can be obtained.

DETAILED DESCRIPTION OF THE INVENTION

For the purposes of this invention, the term "prepolymer" or "isocyanate-terminated prepolymer" are used interchangeably to designate a treatable reaction product of a relatively high equivalent weight isocyanate reactive material and a polyisocyanate, which has an average molecular weight of at least twice that of said relatively high equivalent weight isocyanate reactive material.

The term "quasi-prepolymer" is used herein to describe a solution of the prepolymer in a monomeric polyisocyanate.

The term "monomeric polyisocyanate" refers to a polyisocyanate which is not reacted with a relatively high equivalent weight isocyanate reactive material. However, monomeric polyisocyanates include polyisocyanates which are reacted with relatively low equivalent weight active hydrogen-containing materials and polyisocyanates which contain carbodiimide and/or uretonimine linkages or other derivatives which render the polyisocyanate liquid or of higher functionality.

The term "relatively high equivalent weight isocyanate reactive material" refers to a material having an equivalent weight of at least about 300 and which contains a plurality of groups containing hydrogen atoms which are reactive with an isocyanate group, and which is used to prepare a prepolymer as described herein.

The term "active hydrogen containing material" is used herein to describe any material which contains a plurality of groups which contain active hydrogen atoms, except that used in preparing the prepolymer. As will be apparent to the practitioner, the active hydrogen containing material may be compositionally different, or the same as, the relatively high equivalent weight isocyanate reactive material.

The term "active hydrogen containing composition" refers to a composition comprising at least one active hydrogen containing material, which composition is reacted with the quasi-prepolymer to prepare a polyurethane and/or polyurea polymer.

In this invention, a quasi-prepolymer which is a solution of a prepolymer as defined herein, is reacted with an active hydrogen containing composition to form a polyurethane. The prepolymer is an isocyanate-terminated reaction product of a polyisocyanate and a relatively high equivalent weight isocyanate reactive material. This prepolymer is characterized in that it has an average molecular weight which is at least twice the average molecular weight of the isocyanate reactive material(s) which are used in the preparation of the prepolymer. The molecular weight of the prepolymer is also such that it is tractable, material, i.e. capable of being dissolved in a polyisocyanate to form a quasi-prepolymer. Exemplary such prepolymers have an isocyanate content of about 1 to about 8, preferably about 2 to about 6, more preferably about 2 to about 5% by weight of the prepolymer.

Another commonly used method of describing the isocyanate content of a prepolymer is equivalent weight. Prepolymers useful herein advantageously have an equivalent weight from about 4200 to about 525, preferably about 2100 to about 700, more preferably about 2100 to about 840, subject to the molecular weight limitations described in the proceeding paragraph.

The prepolymer is dissolved in a polyisocyanate, which may be the same or different than that used in preparing the prepolymer, to form a quasi-prepolymer. The amount of polyisocyanate used in preparing such solution depends on several factors, including the desired viscosity of the quasi-prepolymer, the desired flexural modulus of the polyurethane and/or polyurea made therefrom, and like factors. Advantageously, the quasi-prepolymer has an equivalent weight from about 180 to about 840, preferably about 200 to about 525, more preferably about 215 to about 325. Lower equivalent weight quasi-prepolymers tend to have lower viscosities, and tend to form higher modulus polymers than higher equivalent weight quasi-prepolymers.

The polyisocyanate used in preparing the prepolymer can be aliphatic or aromatic. Suitable polyisocyanates are described, for example, in U.S. Pat. Nos. 4,065,410, 3,401,180, 3,454,606, 3,152,162, 3,492,330, 3,001,973, 3,394,164 and 3,124,605, all incorporated herein by reference.

Particularly suitable aromatic polyisocyanates include 2,4- and/or 2,6-toluene diisocyanate (TDI), 2,4'- and/or 4,4''-diphenylmethanediisocyanate (MDI), p-phenylene diisocyanate, polymethylenepolyphenylpolyisocyanates, mixtures thereof and the like. Also useful are polymeric derivatives of MDI, as well as carbodiimide-containing derivatives of MDI (the so-called "liquid MDI") and prepolymers thereof with a relatively low equivalent weight active hydrogen containing material.

Particularly suitable aliphatic polyisocyanates include the hydrogenated derivatives of the foregoing aromatic polyisocyanates, as well as hexamethylene diisocyanate, isophorone diisocyanate, 1,4-cyclohexane diisocyanate and the like. Prepolymers thereof with a relatively low equivalent weight active hydrogen containing material are also useful.

The isocyanate reactive material used in preparing the prepolymer is a compound or mixture of compounds of relatively high equivalent weight which contain at least two active hydrogen containing moieties per molecule. For the purposes of this invention, equivalent weight is calculated on the basis of the number of active hydrogen containing moieties, rather than the number of active hydrogen containing atoms. The term "active hydrogen" is used herein to describe a hydrogen atom which displays significant activity according the the Zerewitnoff test described by Woller in the *Journal of the American Chemical Society*, Vol. 49, page 3181 (1927).

Typical isocyanate reactive materials include polyols, polyamines, polyamides, polymercaptans and polyacids. Of these, polyols and polyamines are preferred. Examples of the preferred polyols are polyether polyols, polyester polyols, hydroxyl functional acrylic polymers, hydroxyl-containing epoxy resins, polyhydroxyl terminated polyurethane polymers, as well as other polyols as described in U.S. Pat. No. 4,394,491, incorporated herein by reference. Of these, the polyester polyols and polyether polyols are preferred, with polyether polyols, particularly polymers of propylene oxide and/or ethylene oxide, being especially preferred. The preferred polyamines are amine-terminated materials which correspond to the preferred polyester and polyether polyols.

The isocyanate reactive material has an equivalent weight of at least about 400, preferably about 700–5000, and more preferably about 700–2000. The isocyanate reactive material also advantageously has a functionality (average number of active hydrogen containing groups per molecule) of about 2 to about 8, preferably about 2–4, and more preferably about 2 to 3.

In preparing the prepolymer, the isocyanate reactive material and the polyisocyanate are reacted in proportions such that the prepolymer has an average molecular weight as indicated before. This reaction is conducted under conditions which promote the reaction of the active hydrogen containing groups and the isocyanate groups. Advantageously, a temperature cf about 20° to about 100° C. is used. A catalyst as described hereinafter can be used if desired. It is preferred to conduct the reaction by adding the isocyanate reactive material continuously or intermittently to the polyisocyanate, particularly when a polyamine is used.

It is within the scope of this invention to employ a low equivalent weight active hydrogen containing material in preparing the prepolymer, in addition to the relatively high equivalent weight isocyanate reactive material described before.

In preparing a polyurethane and/or polyurea polymer from the quasi-prepolymer it is reacted with an active hydrogen containing composition which comprises at least one active hydrogen containing material.

The components of the active hydrogen containing composition can vary somewhat depending on the desired characteristics of the product polyurethane and/or polyurea. In preparing elastomeric polymers, the active hydrogen containing composition advantageously contains at least one relatively low equivalent weight active hydrogen containing material (sometimes referred to as a "chain extender"). In addition, the active hydrogen containing composition may contain a relatively high equivalent weight active hydrogen containing material.

In general, to prepare higher flexural modulus polymers (flexural modulus (unfilled) greater than about 60,000 psi), the proportion of chain extender in the active hydrogen containing composition is increased, as the reaction product of chain extender and monomeric polyisocyanate generally gives rise to hard, high melting segments in the polymer. Thus, the active hydrogen containing composition can consist primary or exclusively (other than non-isocyanate reactive additives) of one or more chain extenders. Especially preferred chain extender mixtures are the subject of the copending application Ser. No. 807,373 of Peffley et al, entitled "Polyurethane Elastomers Prepared in A Two-Step Process Using Mixtures of Chain Extenders", filed Dec. 10, 1985.

Particularly suitable chain extenders include hydroxyl-terminated compounds of 250 or lower equivalent weight, particularly those having from about 2 to about 4, preferably about 2 hydroxyl groups per molecule. Exemplary of such compounds are the alkylene glycols and glycol ethers such as ethylene glycol, propylene glycol, 1,4-butanediol, 1,6-hexanediol, diethylene glycol, triethylene glycol, tetraethylene glycol, dipropylene glycol, tripropylene glycol, glycerine, trimethylolpropane and the like.

Particularly suitable aromatic amine chain extenders include those compounds having about 2 to about 4, preferably about 2 aromatic amine groups per molecule amine groups per molecule, and an equivalent weight of about 250 or less. Equivalent weight is calculated based on the number of amine groups containing at least one active hydrogen atom. Exemplary of such compounds are phenylene diamine, particularly the para isomer, 2,4- and/or 2,6-toluene diamine, the 2,4- and/or 2,6-isomers of diethyltoluenediamine, 2,4'- and/or 4,4'-diaminodiphenylmethane, naphthalene-1,5-diamine 1-methyl-2-methylamino-4-aminobenzene, polyphenyl polymethylene polyamines, 1,3,5-triethyl-2,6-diaminobenzene, mixtures thereof and the like. Also useful are those aromatic amine chain extenders described in U.S. Pat. No. 4,218,543, incorporated herein by reference. Those of the aforementioned aromatic amines which are substituted in each position ortho to an amino group are significantly stearically hindered and react much more slowly than those aromatic amines which are unsubstituted in one or more of the positions ortho to the amine groups.

In additions, aliphatic aminecontaining compounds having about 2 to about 4, preferably about 2 amine groups per molecule and an equivalent weight of about 250 or less are useful as chain extenders. Such compounds include, for example, ethylenediamine, 1,3-diaminopropane, 1,4-diaminobutane, isophorone diamine, diethylene triamine, aminoethylethanolamine, aminoethyl piperazine, 1,6-diamino cyclohexane, poly(oxyalkylene)amines, bis (p-aminocyclohexyl)methane, mixtures thereof and the like. Particularly suitable are aminated polyoxypropylene glycols having an average equivalent weight of about 120 to about 500, although these materials are usually employed in conjunction with another amine or glycol chain extender.

In preparing lower flexural modulus materials, the active hydrogen containing composition may contain only a chain extender, or may further contain a relatively high equivalent weight active hydrogen containing material. It will be understood by those skilled in the art that the isocyanate content of the quasi-prepolymer is a parameter by which the flexural modulus of the polyurethane and/or polyurea can be controlled. Lower isocyanate contents tend to form less stiff polymers. Similarly, the use of substantial proportions of relatively high equivalent weight active hydrogen containing materials in the active hydrogen containing composition also causes less stiff parts to be formed. The relatively high equivalent weight active hydrogen containing material employed is as described with respect to the relatively high equivalent weight isocyanate reactive material, although the relatively high equivalent weight active hydrogen containing material is not necessarily, or even preferably, identical in composition to the relatively high equivalent weight isocyanate reactive material.

In making elastomeric polymers, the amounts of quasi-prepolymer and active hydrogen containing composition are advantageously chosen such that there are provided about 0.7 to about 1.5, preferably about 0.95 to about 1.3, more preferably about 0.95 to about 1.2 isocyanate groups per active hydrogen containing moiety.

Suitable methods for preparing elastomeric polyurethane and/or polyurea polymers are described, for example, in U.S. Pat. Nos. 4,297,444, 4,218,543, 4,444,910, 4,530,941 and 4,269,945, all incorporated herein by reference. Depending of the reactivity of the components, the elastomer can be molded using conventional casting methods, or by using reaction injection molding (RIM) techniques. The use of RIM techniques is favored when relatively fast reacting materials are used, particularly ethylene oxide terminated polyols or amine-terminated polyols, and amine chain extenders or low equivalent weight glycol chain extenders.

In preparing polyurethane and/or polyurea elastomers, it is preferred that the elastomer has a density (exclusive of any inorganic fillers, as described hereinafter) of at least about 0.85 g/cc, preferably about 0.95 g/cc, and more preferably about 1.0 to about 1.2 g/cc.

In addition to preparing elastomers, the quasi-prepolymer of this invention can be used in preparing cellular polyurethanes and/or polyureas, particularly flexible polyurethane foams. In preparing foams, the quasi-prepolymer may be reacted directly with water to form a cellular polymer. More typically, however, the quasi-prepolymer is reacted with an active hydrogen containing composition which comprises at least one active hydrogen containing compound, a blowing agent, a surfactant and one or more catalysts.

Suitable blowing agents include water, low boiling organic compounds, particularly the halogenated alkanes, the so-called azo blowing agents, as well as other materials which liberate a gas under the conditions of the foaming process. Advantageously, about 0.5 to about 5 parts of water per 100 parts active hydrogen containing materials are used, or about 5 to about 50 parts of a halogenated alkane.

Suitable surfactants include the block copolymers of a siloxane and an alkylene oxide. Such surfactants are well known and commercially available. They are advantageously used in amounts sufficient to stabilize the foaming reaction mixture until it cures. Normally about 0.1 to about 3 parts are used per 100 parts active hydrogen containing materials.

Catalysts which are useful in preparing either elastomeric or cellular polymers from the quasi-prepolymer of this invention include tertiary amine compounds and organometallic compounds. Such catalysts are described, for example, in U.S. Pat. No. 4,495,081, incorporated herein by reference. Preferred organometallic catalysts are the organotin catalysts. Generally, about 0.01 to about 1 part of catalyst is used per 100 parts of active hydrogen containing compounds reacted with the quasi-prepolymer, although the precise amount is a matter of choice to the practitioner.

In addition to the foregoing components, other optional materials, such as fillers, pigments, dyes, antioxidants, preservatives, reinforcing fibers, and the like may be used in foams or elastomers prepared from the quasi-prepolymer of this invention.

The quasiprepolymer of this invention is useful in preparing automobile bumpers, fascia, doors and body panels, as well as other elastomeric molded parts, and can also be used to make energy-absorbing padding, automobile dashboards, headrests, furniture cushions and the like.

The following examples are provided to illustrate the invention but are not intended to limit the scope thereof. All parts and percentages are by weight unless otherwise indicated.

EXAMPLE 1

In a suitable container are placed a quantity of 4,4'-diphenylmethanediisocyanate and an ethylene oxide-capped poly(propylene oxide) polyol having a theoretical functionality of about 3 and an equivalent weight of about 1600. The proportions of these materials are chosen such that upon complete reaction, a prepolymer having an NCO content of about 4% by weight is formed. The polyol is added to the diisocyanate over a one-hour period at a temperature of about 85° C. After the polyol addition is complete, the mixture is digested for about 90 minutes at 85° C. Then more 4,4'-diphenylmethanediisocyanate is added to raise the isocyanate content to about 6%.

The resulting prepolymer is then divided in three portions. The first portion is diluted with 4,4'-diphenylmethanediisocyanate to provide Quasi-prepolymer A, having an NCO content of 15.7%. A second portion is diluted to an NCO content of 20.3 (Quasi-prepolymer B). Quasi-prepolymer C is prepared by diluting the third portion to 23.5% NCO.

Elastomer Sample Nos. 1, 2 and 3 are prepared by chain extending Quasi-prepolymers A, B and C, respectively, with 1,4-butanediol. The elastomers are prepared by mixing the chain extender with about 0.75 percent (based on weight of quasi-prepolymer) an organomercury catalyst and heating the mixture to about 100° F. The quasi-prepolymer is preheated to 160° F. The isocyanate index in all cases is 100. The preheated components are thoroughly mixed, poured into a 1/10" flat plaque mold and cured at 300° F. for 20 minutes under 10,000 pounds pressure. After cooling, the resulting Elastomers are tested as indicated in Table I following.

For comparison, a quasi-prepolymer made by reacting 4,4'-MDI with tripropylene glycol and a 1600 equivalent weight ethylene oxide capped poly(propylene oxide) triol at proportions to provide an NCO content of 17.8% is chain extended with 1,4-butane diol in similar manner. This quasi-prepolymer is made directly at a 17.8% NCO content, i.e. no high molecular weight prepolymer is made. This Elastomer (Comparative Sample A) is tested as indicated in Table I.

TABLE I

| Sample No. | 1 | 2 | 3 | A* |
|---|---|---|---|---|
| NCO content[1] | 15.7 | 20.3 | 23.5 | 17.8 |
| % Hard Block[2] | 56.5 | 69.0 | 77.8 | 62.9 |
| Hard Block M.P. °C.[3] | 231 | 235 | 233 | 208 |
| Specific Gravity[2] | 1.18 | 1.21 | 1.23 | 1.13 |
| Tensile Strength[4], psi | 3550 | 3625 | 2600 | 3675 |
| Elongation, %[4] | 221 | 13 | 2 | 38 |
| Flexural Modulus[5], psi | 60,500 | 133,000 | 187,000 | 116,000 |
| Heat Sag[6], in. | 0.17 | 0.08 | 0.12 | 1.04 |
| Tear Strength[7], Die C, p.l.i | 742 | 414 | 176 | 643 |

*Not an example of this invention
[1] NCO content in quasi prepolymer
[2] Ratio of combined weights of chain extender and polyisocyanate to total weight of polymer.
[3] Hard Segment melting point determined by differential scanning calorimetry.
[4] ASTM D-638
[5] ASTM D-790
[6] ASTM D-3769, at 250° F. for 60 minutes with 6" overhang
[7] ASTM D-624

The data in Table I shows the improved thermal properties obtained with the use of the prepolymer of this invention. The hard segment melting points of Samples Nos. 1-3 are almost 30° C. higher than those of the Comparative Sample. In addition, the heat sag values are superior, but a factor of about 10, than that exhibited by Comparative Sample A. The remaining physical properties of Sample Nos. 1-3 are comparable to those of Comparative Sample A, after appropriate adjustments of values due to the differences in hard block contents, which of course effect the results.

EXAMPLE II

A prepolymer is prepared by reacting 4,4'-MDI with a 2000 molecular weight poly(propylene oxide) diol at proportions such that the resulting prepolymer has an isocyanate content of 1.5% by weight. The prepolymer is made and diluted to 6% NCO under the conditions described in Example I. This prepolymer is divided into three portions which are diluted with 4,4'-MDI to 15.9%, 20.3%, and 23.4% NCO, respectively. The resulting Quasi-prepolymers are designated Quasi-prepolymers D, E, and F, respectively.

Quasi-prepolym-ers G, H, and I are prepared in the manner described in Example I, except that a 50/50 blend of the polyols used in preparing Quasi-prepolymers A and D is used. The NCO contents of these Quasi-prepolymers are 15.8, 20.6 and 23.9%, respectively.

Elastomer Sample Nos. 4-9 are prepared by chain extending Quasi-prepolymers D-I with 1,4-butanediol as described in Example I. The Elastomers are then tested, with results as indicated in Table I following.

TABLE II

| Sample No. | 4 | 5 | 6 | 7 | 8 | 9 |
|---|---|---|---|---|---|---|
| NCO content[1] | 15.9 | 20.3 | 23.4 | 15.8 | 20.6 | 23.9 |
| % Hard Block[2] | 58.7 | 70.2 | 78.4 | 57.6 | 69.6 | 78.1 |
| Hard Block M.P. °C.[3] | 234 | 230 | 219 | 229 | 228 | 218 |
| Specific Gravity[2] | 1.17 | 1.20 | 1.20 | 1.17 | 1.20 | 1.21 |
| Tensile Strength[4], psi | 1350 | 1350 | 1125 | 2600 | 1275 | N.D. |
| Elongation, %[4] | 87 | 31 | 21 | 95 | 9 | N.D. |
| Flexural Modulus[5], psi | 51,000 | 71,000 | N.D. | 72,000 | 90,000 | 175,000 |
| Heat Sag[6], in. | 0.48 | 0.50 | 0.44 | 0.25 | 0.125 | N.D. |

TABLE II-continued

| Sample No. | 4 | 5 | 6 | 7 | 8 | 9 |
|---|---|---|---|---|---|---|
| Tear Strength[7], Die C, p.l.i | 347 | 260 | 197 | 682 | 314 | N.D. |

N.D. = Not Determined
[1] NCO content in quasi prepolymer
[2] Ratio of combined weights of chain extender and polyisocyanate to total weight of polymer.
[3] Hard Segment melting point determined by differential scanning calorimetry.
[4] ASTM D-638
[5] ASTM D-790
[6] ASTM D-3769, at 250° F. for 60 minutes with 6" overhang
[7] ASTM D-624

All of Sample Nos. 4-9 exhibit excellent thermal properties and good physical properties.

EXAMPLE III

A prepolymer having an NCO content of 3.45% by weight is prepared by reacting 4,4'-MDI with a 6000 molecular weight ethylene oxide-capped poly(propylene oxide) triol. This prepolymer is diluted to 12% NCO content with additional 4,4'-MDI and designated Quasi-prepolymer J.

Quasi-prepolymer J is chain extended with 1,4-butanediol at a 100 index using an organomercury catalyst to form Elastomer Sample No. 10. Quasi-prepolymer J is degassed by heating under vacuum at about 50° C. The butanediol is added to the prepolymer, and the mixture again degassed. Then, 0.75% by weight of the Quasi-prepolymer of the organomercury catalyst is added, followed by stirring and degassing for thirty seconds. The mixture is then poured onto a 1/10" flat plaque mold which is preheated to 100° F. The mixture is cured at 300° F. for about 30 minutes under about 10,000 pounds pressure. The elastomer (Elastomer Sample No 10) is then postcured for 60 minutes at 150° C.

For oomparison, a Quasi-prepolymer is prepared by directly reacting 4,4'-MDI with the polyol used in preparing Quasi-prepolymer J at proportions sufficient to provide a 12% NCO prepolymer. This prepolymer is chain extended as is Quasi-prepolymer J to form Comparative Sample B.

Elastomer Sample No. 10 and Comparative Sample B are tested for dynamic properties. Hysteresis loss is measured on a 2" by 1" by ⅛" sample. The sample is placed in a Material Testing Systems dynamic tensile testing device with the jaws of the device set two inches apart. The sample is stretched to 2.25 inches, and then the sample is alternately stretched to 2.4 inches and permitted to contract (relax) to 2.1 inches in length. This stretching is done repeatedly at a rate of about 1 cycle per second. A stress-strain curve is generated for both the streching mode and the relaxing mode. The area under the stretching mode curve represents the energy imparted to the system during stretching. The area under the relaxing mode represents the energy released by the system during contraction, and is always less that the stretching energy. The hysteresis loss is calculated as the difference between the energy of stretching and the energy of relaxation, divided by the energy of stretching. Low values are preferred in this test.

Cycles to Failure is evaluated by mounting a similar sample on the tensile testing apparatus, and elongating to 2.05 inches. At this elongation, the sample is cut along its side to a depth of 0.05". The notched sample is then alternately stretched between 2.1 and 2.4 inches at a rate of about 2 cycles per second until it ruptures. The number of cycles completed before rupture is reported at Cycles to Failure. The results of this testing are as reported in Table III following.

TABLE III

| Sample No. | Hysteresis Loss | Cycles to Failure |
|---|---|---|
| 10 | 15.1% | 4100 |
| B* | 20.2% | 1400 |

*Not an example of this invention.

As can be seen from the data in Table III, both the hysteresis loss and the cycles to failure are substantially improved with the use of the prepolymer of this invention.

EXAMPLE IV

A prepolymer as described in Example III is diluted to an isocyanate content of 24.5% with a 135 equivalent weight liquid MDI. About 179 parts of the resulting Quasi-prepolymer is then reacted with the following active hydrogen containing composition:

| | |
|---|---|
| Adduct of aminoethanolethanol amine and 3 moles of propylene oxide | 50 parts |
| Diethylene glycol | 15 parts |
| Freon-11 | 12.2 parts |
| Silicone surfactant | 1 part |
| Tin catalyst | 0.01 part |

Physical properties of the resulting molding (Sample No. 11) are indicated in Table IV following.

For comparision, a molding is made using the following formulation:

| | |
|---|---|
| Adduct of aminoethanolethanol amine and 3 moles of propylene oxide | 50 parts |
| Diethylene glycol | 15 parts |
| Freon-11 | 12.5 parts |
| 5000 MW aminoethylpiperazine-initiated poly(propylene oxide) | 35 parts |
| Silicone surfactant | 1 part |
| Tin Catalyst | 0.02 part |
| Liquid MDI (135 equivalent weight) | 144.9 parts |

In this formulation, the 5000 molecular weight polyol and the MDI are used in place of the Quasi-prepolymer used in Sample No. 11. The physical properties of this molding (Comparative Sample C) are as reported in Table IV following.

TABLE IV

| Sample No. | 11 | C* |
|---|---|---|
| Specific Gravity, g/cc | 0.92 | 0.94 |
| Flexural Modulus[1] psi | 203,000 | 223,000 |
| Flexural Strength[1] psi | 7,500 | 7,100 |
| Tensile Strength[2], psi | 3,800 | N.D. |
| Gardner Impact Strength[3], ft-lb | 52 | 51 |

TABLE IV-continued

| Sample No. | 11 | C* |
|---|---|---|
| Heat Distortion Temp.,[4], °F. | 182 | 161 |

[1] D-790
[2] D-638
[3] D-3029 data reported for 0.85 g/cc density samples
[4] 264 psi. Data for Sample 11 determined on a Sample of 0.85 g/cc.

As can be seen from this data, the Sample of this invention has a substantially improved heat distortion temperature. This is evidence of improve phase segregation in the polymer. Surprisingly, this improvement is achieved without any loss of impact strength. Normally, improvements in one of these properties is accompanied by a loss in the other. Accordingly, the formulation used in Sample No. 11 can be modified, primarily by reducing the amount of chain extenders used, to obtain a polymer having a heat distortion temperature equivalent to that of Comparative Sample C, but which will have a significantly improved impact strength.

What is claimed is:

1. In a process for preparing polyurethane and/or polyurea polymers wherein an isocyanate terminated Quasi-prepolymer is reacted with an active hydrogen-containing composition to form a polyurethane and/or polyurea polymer, the improvement comprising employing as the Quasi-prepolymer a solution of an isocyanate terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

2. The process of claim 1 wherein said prepolymer has a isocyanate content of about 1 to about 8% by weight.

3. The process of claim 2 wherein said Quasi-prepolymer has an equivalent weight of about 200 to about 525.

4. The process of claim 3 wherein said prepolymer comprises the reaction product of an isocyanate-reactive material having an equivalent weight of about 700 to about 2000 and an aromatic polyisocyanate.

5. The process of claim 4 wherein said isocyanate-reactive material is a polyether polyol or amine-terminated polyether and the aromatic polyisocyanate comprises 2,4'-and/or 4,4'-diphenylmethanediisocyanate or derivatives thereof.

6. The process of claim 5 wherein said polyurethane and/or polyurea polymer has a density of at least about 0.95 g/cc.

7. The process of claim 4 wherein said active hydrogen containing composition comprises a relatively low equivalent weight active hydrogen containing material.

8. The process of claim 7 wherein said active hydrogen containing composition further comprises a relatively high equivalent weight active hydrogen containing material.

9. The process of claim 7 wherein about 0.95 to about 1.3 isocyanate groups are present per active hydrogen containing moiety.

10. The process of claim 3 wherein said prepolymer comprises the reaction product of an isocyanate-reactive material having an equivalent weight of about 700 to about 2000 and an aliphatic polyisocyante.

11. The process of claim 10 wherein said isocyanate-reactive material is a polyether polyol or an amine-terminated polyether.

12. A Quasi-prepolymer which comprises a solution of an isocyanate-terminated prepolymer in a monomeric polyisocyanate, wherein said isocyanate-terminated prepolymer is the reaction product of a polyisocyanate and a relatively high equivalent weight isocyanate-reactive material, and said isocyanate-terminated prepolymer has an average molecular weight of at least twice that of said relatively high equivalent weight isocyanate-reactive material.

13. The Quasi-prepolymer of claim 12 wherein said prepolymer has an isocyanate content of about 1 to about 8% by weight.

14. The Quasi-prepolymer of claim 13 which has an equivalent weight of about 200 to about 525.

15. The Quasi-prepolymer of claim 14 wherein said prepolymer comprises the reaction product of an isocyanate-reactive material having an equivalent weight of about 700 to about 2000 and an aromatic polyisocyanate.

16. The Quasi-prepolymer of claim 15 wherein said isocyanate-reactive material is a polyether polyol or amine-terminated polyether and the aromatic polyisocyanate comprises 2,4'- and/or 4,4'-diphenylmethanediisocyanate or derivatives thereof.

17. The Quasi-prepolymer of claim 14 wherein said prepolymer comprises the reaction product of an isocyanate-reactive material having an equivalent weight of about 700 to about 2000 and an aliphatic polyisocyante.

18. The Quasi-prepolymer of claim 17 wherein said isocyanate-reactive material is a polyether polyol or an amine-terminated polyether.

* * * * *